Figure 1:
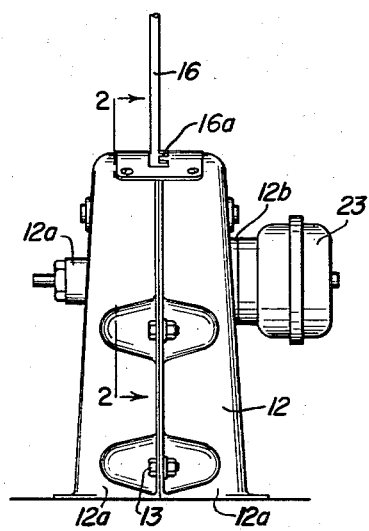

Feb. 16, 1965 R. N. HUNSAKER ETAL 3,169,616

APPARATUS FOR PREVENTING PREMATURE SHIFTING OF GEARS

Filed May 11, 1962 2 Sheets-Sheet 1

INVENTOR.
ROLLO N. HUNSAKER
SVEN E. JOHANSSON
BY
ATTORNEYS

Feb. 16, 1965   R. N. HUNSAKER ETAL   3,169,616
APPARATUS FOR PREVENTING PREMATURE SHIFTING OF GEARS
Filed May 11, 1962   2 Sheets-Sheet 2
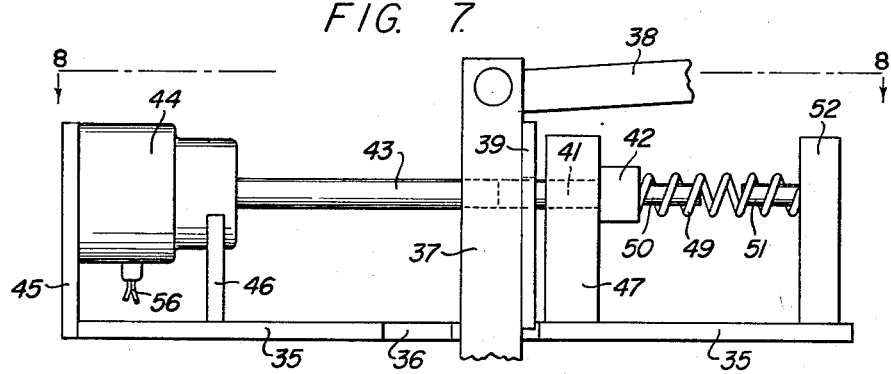
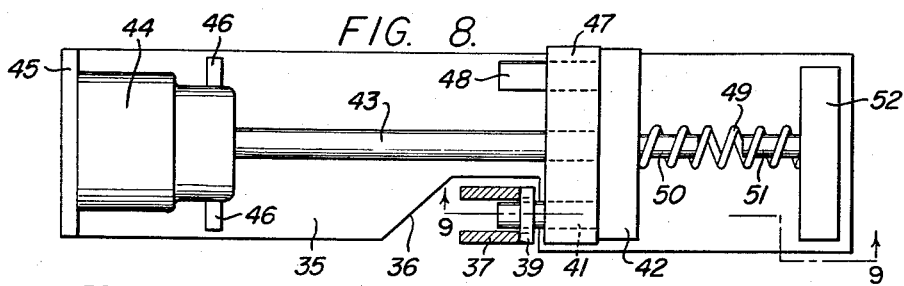
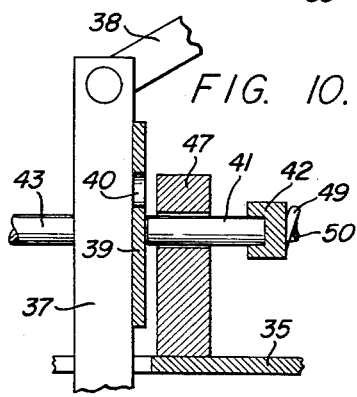
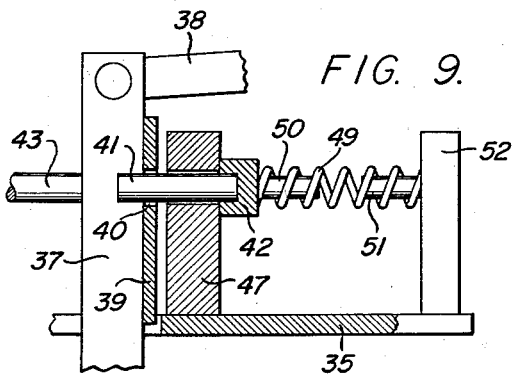
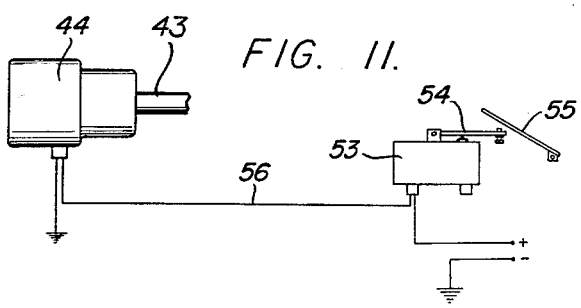
INVENTOR.
ROLLO N. HUNSAKER
SVEN E. JOHANSSON
BY
ATTORNEYS United States Patent Office 3,169,616
Patented Feb. 16, 1965

3,169,616
APPARATUS FOR PREVENTING PREMATURE
SHIFTING OF GEARS
Rollo N. Hunsaker, Ray, Ariz., and Sven E. Johansson, Goteborg, Sweden, assignors to Kennecott Copper Corporation, New York, N.Y., a corporation of New York
Filed May 11, 1962, Ser. No. 194,079
10 Claims. (Cl. 192—4)

This invention relates to manual shift, gear transmissions, and is particularly concerned with the prevention of gear damage in automotive vehicles, such as heavy trucks, which frequently occurs by reason of the driver shifting into reverse gear while the vehicle is still moving forward, or by his shifting into a forward gear while the vehicle is still moving backward. The invention is also applicable to various types of stationary machinery having drive gearing shiftable from one direction of motion to an opposite direction.

In some situations, as in the mining and heavy construction industries, exceptionally large and heavy trucks are employed. These are ordinarily equipped with manual shift, gear transmissions and are used under circumstances requiring frequent shifting from a forward drive to reverse drive and vice versa. It has become common practice for drivers to shift from one to the other without coming to a full stop. This imposes on mechanical parts overloads so severe as to result in early failure of gears and associated elements and consequent work stoppages.

In some types of heavy industrial trucks available commercially, manually operable locks are supplied to prevent this kind of damage, but drivers can and frequently do inactivate the lock mechanisms in the interest of convenience.

It is a principal object of the present invention to provide tamper-proof apparatus in connection with the gear shifting mechanism of a vehicle which will automatically prevent shifting of gears from forward to reverse drive and vice versa while the vehicle is still moving, without making it necessary for the operator to perform a special unlocking operation before he can shift.

This is accomplished by providing shift-locking mechanism with means normally operable to throw such mechanism into locked condition when it is in a neutral position, intermediate forward drive and reverse drive positions, and means arranged to operate concurrently with the brakes for unlocking such mechanism.

The same general construction of apparatus can be utilized with other types of machinery, both mobile and stationary, involving the shifting of gears from positive drive in one direction to positive drive in the reverse direction.

The apparatus of the invention can be readily applied to standard gear transmissions of various types without substantial modification of the latter. It is preferably constructed for power operation, either by a pressure fluid or by electricity, under the control of the brake pedal or other brake-applying device.

Specific embodiments of apparatus representing what are presently regarded as the best modes of carrying out the invention are illustrated in the acompanying drawings. From the detailed description of these, other more specific objects and features of the invention will become apparent.

Figure 2:
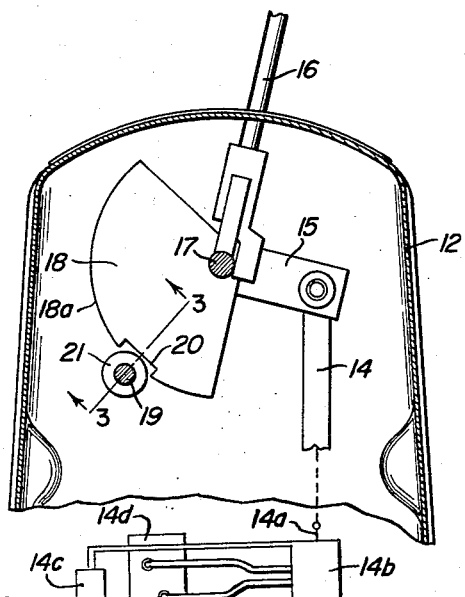
Figure 3:
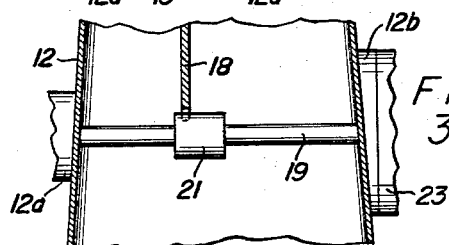
Figure 4:
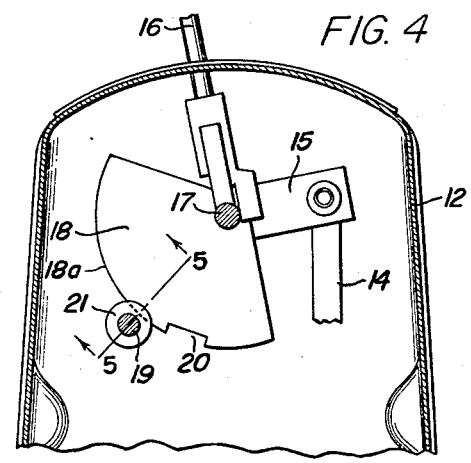
Figure 5:
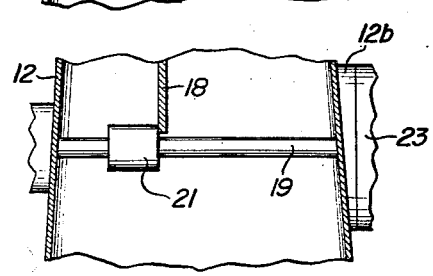
Figure 6:
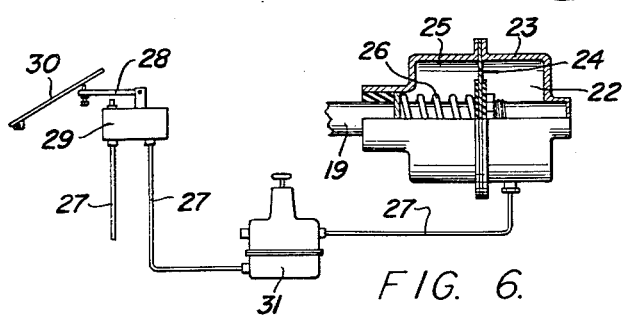

In the drawings:

FIG. 1 is a view in rear elevation of gear shifting mechanism incorporating a preferred form of the present invention;

FIG. 2, a fragmentary vertical section taken on the line 2—2 of FIG. 1 and drawn to a considerably larger scale, the mechanism being shown locked in its neutral position and, shown diagrammatically, a control valve actuated by the mechanism, a reservoir and pump, and a transmission shifted in accordance with control valve position;

FIG. 3, a fragmentary transverse section taken on the line 3—3 of FIG. 2;

FIG. 4, a view corresponding to that of FIG. 2, but showing the mechanism unlocked and in a forward drive position;

FIG. 5, a view corresponding to that of FIG. 3, but taken on the line 5—5 of FIG. 4;

FIG. 6, a schematic showing of a fluid pressure actuating and control system for the gear shifting mechanism of the foregoing figures;

FIG. 7, a side elevation of a different embodiment of the invention shown in locked neutral position;

FIG. 8, a horizontal section taken on the line 8—8 of FIG. 7;

FIG. 9, a fragmentary vertical section taken on the line 9—9 of FIG. 8;

FIG. 10, a view corresponding to that of FIG. 9 but more fragmentary in character and showing the shift mechanism in an unlocked, drive position; and FIG. 11, a schematic showing of an electrical actuating and control system used in the embodiment of FIGS. 7-10.

Referring to the drawings:

In the embodiment of FIGS. 1-6, the apparatus of the invention is associated with the conventional gear shift pedestal 12 of a large truck of commercially available type widely used for hauling heavy loads of ore and other earth materials in the mining industry.

As illustrated, pedestal 12 is formed of two similar housing sections 12a secured together as by means of bolts 13.

Within pedestal 12 is the usual shift mechanism, including linkage 14 attached to lever arm 15, which, in common with manual shift lever 16, is rigidly secured to a shaft 17 journaled in the pedestal.

Linkage 14 connects in customary manner with the transmission, while lever 16 projects upwardly and outwardly of the top of the pedestal through notched slot 16a for forward and backward movement from notch to notch in the usual manner to change gears through forward and reverse speed ratios.

As is illustrated diagrammatically in FIG. 2, linkage arm 14 can be connected, for example, to the reciprocating rod 14a of a control valve 14b, the position of which regulates supply and exhaust of fluid between the combined pump and reservoir 14c and a hydraulic transmission, 14d.

In accordance with the invention, a sector plate 18 is also rigidly secured to shaft 17, so as to confront with its arcuate edge 18a a latch bar 19. Edge 18a of plate 18 is notched at 20 to provide a latch keeper for a latch member 21 rigidly secured to latch bar 19.

Latch bar 19 is mounted for longitudinal sliding movement in the side walls of pedestal 12 by means of bosses 12a and 12b, through which it extends, and projects into fluid pressure chamber 22, FIG. 6, of a housing 23 fastened to boss 12b. Latch bar 19 extends through diaphragm 24, which seals chamber 22 from a second chamber 25 housing a coiled compression spring 26. This assembly closely resembles a conventional brake chamber as used with trucks of this kind.

Spring 26 is normally operable to throw latch bar 19 into a position where latch member 21 engages keeper notch 20 of sector plate 18 when the shift mechanism is in neutral position between forward and reverse drives, see FIGS. 2 and 3. This, of course, locks such shift mechanism against movement and prevents any shifting into forward or reverse.

This locking position is automatically assumed whenever there is shifting from a forward drive through neutral to reverse drive and vice versa.

In order to release this locking of the gear shifting mechanism, so there can be the desired shift into a drive whose direction of motion is opposite that existing at any given time, provision is made for introducing a pressure fluid into chamber 22, which distends diaphragm 24 to the left in FIG. 6 against the urge of spring 26 and pushes latch bar 19 to the left, displacing latch member 21 from the locking position of FIGS. 2 and 3 to the unlocking position of FIGS. 4 and 5, where it is free of keeper notch 20. In this unlocked position, the gear shift mechanism can be freely moved through the entire range of drive ratios on any given side of neutral, but, if an attempt is made to shift through neutral, the shift mechanism again locks.

It is a feature of the invention that introduction and release of pressure fluid into and from pressure chamber 22 is controlled by the agency for applying the brakes on the vehicle or other machine concerned. Thus, as illustrated in FIG. 6, where an air line 27 supplies pressure air to chamber 22 from the compressed air system with which a truck is normally equipped, the spring-biased actuating lever 28 of a control valve 29 interposed in such air line is positioned under the brake pedal 30, so as to be pressed to open the valve by depression of such pedal in the application of the brakes. This means that the gear shift mechanism is unlocked only when the brakes are applied.

It is desirable to interpose in air line 27 a pressure regulator 31 in order to delay the unlocking action somewhat following full application of the brakes. By proper adjustment of such pressure regulator, unlocking can be made to occur only after the vehicle or machine has come to a complete stop.

It is to be understood that the shift locking mechanism can be hydraulically actuated if desired by making suitable modifications in the actuating and control equipment.

The foregoing embodiment is designed primarily for mounting in direct association with the manual shift lever of a heavy haulage truck, in the cab of such truck, which may or may not be remote from the transmission. The embodiment of FIGS. 7–11 is designed for mounting directly on the transmission of such a truck, with a linkage connection to the manual shift lever in the cab.

As illustrated in FIGS. 7–11, a base plate 35 is secured in some suitable manner to or above the truck transmission (not shown), and is notched at 36 to accommodate the usual pair of mutually spaced links 37 which are adapted to be raised and lowered by means of linkage 38 in the shifting from one drive to another by means of a remotely located manual shift lever (not shown).

In accordance with the invention a latch plate 39, having a keeper hole 40 formed therein at neutral shift position, is rigidly secured, as by welding, across the two links 37, so as to bridge the space therebetween.

A latch bar or pin 41 projects toward latch plate 39 in registry with the vertical path of movement of keeper hole 40. It is rigidly mounted in and projects from a carriage 42, which is mounted on one end of a push rod 43 whose other end forms part of a solenoid 44.

Solenoid 44 is supported by structural members 45 and 46 rising from base plate 35, and push rod 43 is supported in its back and forth movement by a block 47 through which it extends. Latch pin 41 also extends and slides back and forth through block 47, as does a counterpart thereof, 48, provided as a guide at the other end of carriage 42.

A return spring 49 is coiled about mutually aligned stub rods 50 and 51, which project toward each other from rigid securement to carriage 42 and to a structural member 52, respectively, the latter rising from rigid securement to base plate 35. Spring 49 bears against both carriage 42 and member 52, and serves to normally urge carriage and latch bar toward latch plate 39.

Thus, the free end of latch pin 41 normally bears against latch plate 39 and, when the shift linkage is in its neutral position, latch pin 41 enters keeper hole 40 and locks such shift linkage against movement.

As in the previous embodiment, means are provided for operating concurrently with the application of the brakes of the equipment concerned, for unlocking the aforedescribed locking mechanism of this embodiment. Such means may be a fluid pressure system essentially similar to that of FIG. 6, but, as illustrated in FIG. 11, is an electrically powered system.

A commercially available time delay switch 53 has its spring-biased actuating lever arm 54 positioned under brake pedal 55 and is interposed in an electrical line 56 leading from the battery of the truck to the coil of solenoid 44. The switch is normally open.

When the truck brakes are applied, arm 54 is depressed to close switch 53, and, after a suitably set time delay sufficient to insure stopping of the truck, solenoid 44 operates to retract push rod 43 and to thereby disengage latch pin 41 from its neutral keeper hole 40. As thus unlocked, shift links 37 are free to move vertically upwardly or downwardly to shift transmission gears to a new drive position.

Whereas there are here illustrated and described specific forms of apparatus which we presently regard as the best modes of carrying out our invention, it should be understood that various changes may be made and other constructions adopted without departing from the inventive concepts particularly pointed out herebelow.

We claim:

1. Apparatus for preventing premature shifting of gears from one direction to a reverse direction in equipment which includes gear shifting means having at least one forward drive position and a reverse drive position, and braking means for said equipment said apparatus comprising, in combination, means normally operable to lock said shifting means in a neutral position between a forward drive position and a reverse drive position; and means arranged to operate concurrently in response to actuation of said braking means for unlocking the lock means and thereby permitting shifting from a forward drive position to a reverse drive position and vice versa.

2. Apparatus for preventing premature shifting of gears from one direction to a reverse direction in equipment which includes gear shifting means having at least one forward drive position and a reverse drive position, and braking means for said equipment, said apparatus comprising, in combination, means normally operable to lock said shifting means in a neutral position between a forward drive position and a reverse drive position;

means arranged to operate concurrently with said braking means for unlocking the lock means and thereby permitting shifting from a forward drive position to a reverse drive position and vice versa; and means in association with the unlocking means for momentarily delaying the unlocking operation upon actuation of the braking means.

3. Apparatus for preventing premature shifting of gears from one direction to a reverse direction in equipment which includes gear shifting means having at least one forward drive position and a reverse drive position and braking means for said equipment, said apparatus comprising, in combination, means normally operable to lock said shifting means in a neutral position between a forward drive position and a reverse drive position, said means including a latch plate associated and movable with the gear shifting means and having a keeper opening formed therein, and a latch bar placed in alignment with the position of said keeper opening in the neutral position of the gear shift means;

resilient means normally urging said latch bar toward locking engagement with said keeper opening; and means arranged to operate concurrently with said braking means for unlocking the lock means and thereby permitting shifting from a forward drive position to a reverse drive position and vice versa, said last-named means including means for axially moving said latch bar against the urge of said resilient means, and means operable by the braking means for actuating the latch bar moving means.

4. The apparatus of claim 3, wherein the gear shift means includes a manual shift device and a shaft rotatable in one direction or the reverse direction by said device, and wherein the latch plate is a sector plate secured at its vertex to said shaft so that its arcuate edge confronts the latch bar, and the keeper opening is a notch in said arcuate edge; and the latch bar is mounted for reciprocation adjacent said arcuate edge and includes a latching protuberance for locking engagement with the keeper notch.

5. The apparatus of claim 3, wherein the gear shift means includes shift linkage arranged for reciprocation in accordance with shifting of gears, and wherein the latch plate is carried by said shift linkage in direct opposition to an end of the latch bar; and said end of the latch bar is urged against the face of said plate in drive positions and into the keeper opening in neutral position of said shift linkage.

6. The apparatus of claim 3, wherein the equipment braking means includes a manually operable lever, the latch bar moving means is a fluid pressure actuated device, and the means for actuating said latch bar moving means includes a pressure fluid supply line leading to said device from a source of fluid under pressure; and a control valve interposed in said line and having a resiliently-biased actuating member placed in the line of action of the braking lever and arranged to be thrown thereby upon actuation of the braking means.

7. The apparatus of claim 6, wherein the means for actuating the latch bar moving means additionally includes a pressure regulator for momentarily delaying the unlocking operation upon actuation of the braking means.

8. The apparatus of claim 3, wherein the equipment braking means includes a manually operable lever, the latch bar moving means is a solenoid, and the means for actuating said latch bar moving means includes an electric circuit arranged for connection to a source of electric power and to supply said power to the solenoid; and an electric switch interposed in said circuit and having a resiliently-biased actuating member placed in the line of action of the braking lever and arranged to be thrown thereby upon actuation of the braking means.

9. The apparatus of claim 8, wherein the electrical switch is of time delay type.

10. Apparatus for preventing premature shifting of gears from one direction to a reverse direction in equipment which includes gear shifting means having at least one forward drive position and a reverse drive position, and braking means for said equipment, said apparatus comprising, in combination, means normally operable to lock said shifting means in a neutral position between a forward drive position and a reverse drive position, said lock means including latch means associated and movable with the gear shift means, cooperating latch means placed in position for engaging the first name latch means when said gear shift means is its neutral position, and means normally urging said cooperating latch means toward locking engagement with the other latch means; and means arranged to operate concurrently with said braking means for unlocking the lock means and thereby permitting shifting from a forward drive position to a reverse position and vice versa, said last-named means including means for moving said cooperating latch means away from locking engagement with the other latch means, and means operable by the braking means for actuating the said means for moving the cooperative latch means.

References Cited in the file of this patent

UNITED STATES PATENTS 1,651,569  12/27  Wilson.
2,961,078  11/60  Shannon et al. _____ 74—361 X DAVID J. WILLIAMOWSKY, *Primary Examiner.*

FRANK SUSKO, *Examiner.*